(12) United States Patent
Purdy (10) Patent No.: US 7,069,098 B2
(45) Date of Patent: Jun. 27, 2006

(54) METHOD AND SYSTEM FOR PRIORITIZING MATERIAL TO CLEAR EXCEPTION CONDITIONS

(75) Inventor: Matthew A. Purdy, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 27 days.

(21) Appl. No.: 10/909,606

(22) Filed: Aug. 2, 2004

(65) Prior Publication Data

US 2006/0025879 A1   Feb. 2, 2006

(51) Int. Cl.
*G06F 19/00*   (2006.01)

(52) U.S. Cl. .................................................. 700/101

(58) Field of Classification Search ............... 700/95, 700/99–101, 117–121
See application file for complete search history.

(56) References Cited

U.S. PATENT DOCUMENTS

| | | | |
|---|---|---|---|
| 5,402,367 A | 3/1995 | Sullivan et al. | 364/578 |
| 5,586,039 A | 12/1996 | Hirsch et al. | 364/468.01 |
| 5,620,556 A | 4/1997 | Henck | 438/8 |
| 5,657,252 A | 8/1997 | George | 364/550 |
| 5,661,669 A | 8/1997 | Mozumder et al. | 364/552 |
| 5,770,098 A | 6/1998 | Araki et al. | 216/67 |
| 5,822,218 A | 10/1998 | Moosa et al. | 364/488 |
| 5,896,294 A | 4/1999 | Chow et al. | 364/468.28 |
| 5,982,920 A | 11/1999 | Tobin, Jr. et al. | 382/145 |
| 5,999,003 A | 12/1999 | Steffan et al. | 324/537 |
| 6,002,989 A | 12/1999 | Shiba et al. | 702/84 |
| 6,136,712 A | 10/2000 | Klippert, II et al. | 438/692 |
| 6,166,801 A | 12/2000 | Dishon et al. | 355/27 |
| 6,245,581 B1 | 6/2001 | Bonser et al. | 438/8 |
| 6,248,602 B1 | 6/2001 | Bode et al. | 438/14 |
| 6,263,255 B1 | 7/2001 | Tan et al. | 700/121 |
| 6,281,962 B1 | 8/2001 | Ogata et al. | 355/27 |
| 6,303,395 B1 | 10/2001 | Nulman | 438/14 |
| 6,337,217 B1 | 1/2002 | Hause et al. | 438/7 |
| 6,374,199 B1 | 4/2002 | Sugimoto | 703/2 |
| 6,397,122 B1 | 5/2002 | Lindstrom et al. | 700/145 |
| 6,403,385 B1 | 6/2002 | Venkatkrishnan et al. | 438/14 |
| 6,408,219 B1 | 6/2002 | Lamey, Jr. et al. | 700/110 |
| 6,421,574 B1 | 7/2002 | Steffan et al. | 700/121 |
| 6,442,496 B1 | 8/2002 | Pasadyn et al. | 702/83 |
| 6,461,878 B1 | 10/2002 | Lansford | 438/14 |
| 6,469,518 B1 | 10/2002 | Davis et al. | 324/600 |
| 6,470,231 B1* | 10/2002 | Yang et al. | 700/121 |
| 6,477,432 B1 | 11/2002 | Chen et al. | 700/51 |

(Continued)

FOREIGN PATENT DOCUMENTS

EP   1 072 967 A2   1/2001

(Continued)

OTHER PUBLICATIONS

Williams et al., "Optimized Sample Planning for Wafer Defect Inspection," 1999 IEEE.

(Continued)

*Primary Examiner*—Maria N. Von Buhr
(74) *Attorney, Agent, or Firm*—Williams, Morgan & Amerson, P.C.

(57) ABSTRACT

The present invention is generally directed to various methods and systems for prioritizing material to clear exception conditions. In one illustrative embodiment, the method includes providing a plurality of workpieces, each of the workpieces having an associated quantity of material that cannot be processed until the workpiece has been processed, and determining a priority for processing each of the plurality of workpieces based upon at least the associated quantity of material that cannot be processed.

30 Claims, 3 Drawing Sheets

U.S. PATENT DOCUMENTS

| | | | |
|---|---|---|---|
| 6,526,547 B1 | 2/2003 | Breiner et al. | 716/4 |
| 6,564,113 B1 * | 5/2003 | Barto et al. | 700/99 |
| 6,577,972 B1 | 6/2003 | Yanaru et al. | 702/83 |
| 6,606,530 B1 * | 8/2003 | Brouwers | 700/101 |
| 6,650,955 B1 | 11/2003 | Sonderman et al. | 700/108 |
| 6,687,561 B1 | 2/2004 | Pasadyn et al. | 700/110 |
| 6,687,563 B1 * | 2/2004 | Wang et al. | 700/121 |
| 6,790,686 B1 * | 9/2004 | Purdy et al. | 438/14 |
| 6,801,820 B1 * | 10/2004 | Lilly et al. | 700/100 |
| 6,821,792 B1 | 11/2004 | Sonderman et al. | 438/5 |
| 6,892,106 B1 * | 5/2005 | Wu et al. | 700/101 |
| 6,931,296 B1 * | 8/2005 | Lin et al. | 700/101 |
| 2002/0193899 A1 | 12/2002 | Shanmugasundram | 700/108 |

FOREIGN PATENT DOCUMENTS

WO    WO 02/103778 A2    12/2002

OTHER PUBLICATIONS

McIntyre et al., "Key Considerations in the Development of Defect Sampling Methodologies," 1996 IEEE.

Kurtoglu, "Flexibility analysis of two assembly lines," *Robotics and Computer-Integrated Manufacturing*, 20:247-53, 2004.

* cited by examiner

METHOD AND SYSTEM FOR PRIORITIZING MATERIAL TO CLEAR EXCEPTION CONDITIONS

BACKGROUND OF THE INVENTION

1. Field of the Invention

This invention relates generally to an industrial process, and, more particularly, to various methods and systems for prioritizing material to clear exception conditions.

2. Description of the Related Art

After a complete reading of the present application, those skilled in the relevant art will understand that the present invention has broad application to a variety of industries involving the manufacture of a variety of different types of devices or workpieces. By way of example only, the background of the application will be discussed in the context of various problems encountered in the manufacture of integrated circuit devices. However, the present invention is not to be considered as limited to use only within the semiconductor manufacturing industry.

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a lot of wafers using a variety of process tools, including photolithography steppers, etch tools, deposition tools, polishing tools, thermal anneal process tools, implantation tools, etc. The technologies underlying semiconductor process tools have attracted increased attention over the last several years, resulting in substantial refinements. However, despite the advances made in this area, many of the process tools that are currently commercially available suffer certain deficiencies. In particular, some of such tools often lack advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These deficiencies can engender non-optimal control of critical processing parameters, such as throughput, accuracy, stability and repeatability, processing temperatures, mechanical tool parameters, and the like. This variability manifests itself as within-run disparities, run-to-run disparities and tool-to-tool disparities that can propagate into deviations in product quality and performance, whereas an ideal monitoring and diagnostics system for such tools would provide a means of monitoring this variability, as well as providing means for optimizing control of critical parameters.

One technique for improving the operation of a semiconductor processing line includes using a factory wide control system to automatically control the operation of the various process tools. The manufacturing tools communicate with a manufacturing frame-work or a network of processing modules. Each manufacturing tool is generally connected to an equipment interface. The equipment interface is connected to a machine interface that facilitates communications between the manufacturing tool and the manufacturing frame-work. The machine interface can generally be part of an advanced process control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices.

During the fabrication process various events may take place that affect the perform-ance of the devices being fabricated. That is, variations in the fabrication process steps result in device performance variations. Factors, such as feature critical dimensions, doping levels, contact resistance, particle contamination, etc., all may potentially affect the end performance of the device. Various tools in the processing line are controlled in accordance with perform-ance models to reduce processing variation. Commonly controlled tools include photo-lithography steppers, polishing tools, etching tools, and deposition tools. Pre-processing and/or post-processing metrology data is supplied to process controllers for the tools. Operating recipe parameters, such as processing time, are calculated by the process controllers based on the performance model and the metrology information to attempt to achieve post-processing results as close to a target value as possible. Reducing variation in this manner leads to increased throughput, reduced cost, higher device performance, etc., all of which equate to increased profitability.

In current day manufacturing environments, a variety of automated process control applications may be employed to control manufacturing activities. However, when automated process control is implemented, it is not uncommon to also implement various business rules to limit the risk associated with the implementation of the advanced process control applications. For example, a business rule may be adopted to require special processing to initialize a controller, i.e., an initialization exception condition, or to limit the amount of product that can be processed without obtaining metrology feedback, i.e., a jeopardy exception condition.

In general, an exception condition may be understood to be a condition that would interfere with running production wafers in the fabrication facility. For example, an exception condition may be considered to arise when a workpiece has an associated quantity of material, i.e., additional workpieces, that cannot be processed until the initial workpiece has been successfully processed. There may be many different types of exception conditions within the manufacturing facility at any given time. For example, a new process recipe may be implemented with a particular operation. However, since the process recipe is new, there is no historical metrology data associated with devices produced using the new recipe. Thus, in one example, a business rule may be adopted such that an initial lot of wafers may be processed using the new recipe, but additional lots of wafers cannot be processed until metrology data is acquired and analyzed for this initial lot. In short, this manufacturing operation may, in effect, be on hold pending the acquisition and analysis of metrology data related to this initial lot. Each of the various exception conditions have the potential to disrupt manufacturing activities by preventing material from being processed. In general, normal production activities cannot continue until certain material can clear the exception condition.

For manufacturing operations to proceed effectively, methods have been developed for prioritizing the processing of material to clear such exception conditions. In some cases, specific priorities are assigned to different exception types, e.g., initializing, jeopardy, etc. For example, processing materials, e.g., a lot of wafers, that clear an initialization exception is given a higher priority than a lot that can clear a jeopardy exception. However, such a methodology of clearing exceptions by exception type may not be the most efficient in terms of overall operation of the manufacturing facility.

The present invention is directed to overcoming, or at least reducing the effects of, one or more of the problems set forth above.

SUMMARY OF THE INVENTION

The present invention is generally directed to various methods and systems for prioritizing material to clear exception conditions. The present invention may be used with tools adapted to perform a variety of operations, e.g., process operations, metrology operations, etc. In one illustrative embodiment, the method comprises providing a plurality of workpieces, each of the workpieces having an associated quantity of material that cannot be processed until the workpiece has been processed, and determining a priority for processing each of the plurality of workpieces based upon at least the associated quantity of material that cannot be processed. The present invention may be employed with any type of workpiece, e.g., a plurality of wafers or wafer lots.

In another illustrative embodiment, the method comprises providing a plurality of workpieces, for each of the workpieces, identifying a quantity of material that cannot be processed until the workpiece has been subjected to at least one metrology operation, and determining a priority for processing each of the plurality of workpieces based upon at least the quantity of material that cannot be processed.

In yet another illustrative embodiment, the method comprises providing a plurality of wafer lots, for each of the wafer lots, identifying a quantity of material that cannot be processed until the wafer lot has been subjected to at least one metrology operation, and determining a priority for processing each of the plurality of wafer lots based upon the identified quantity of material that cannot be processed.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Various structures, systems and devices may be schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
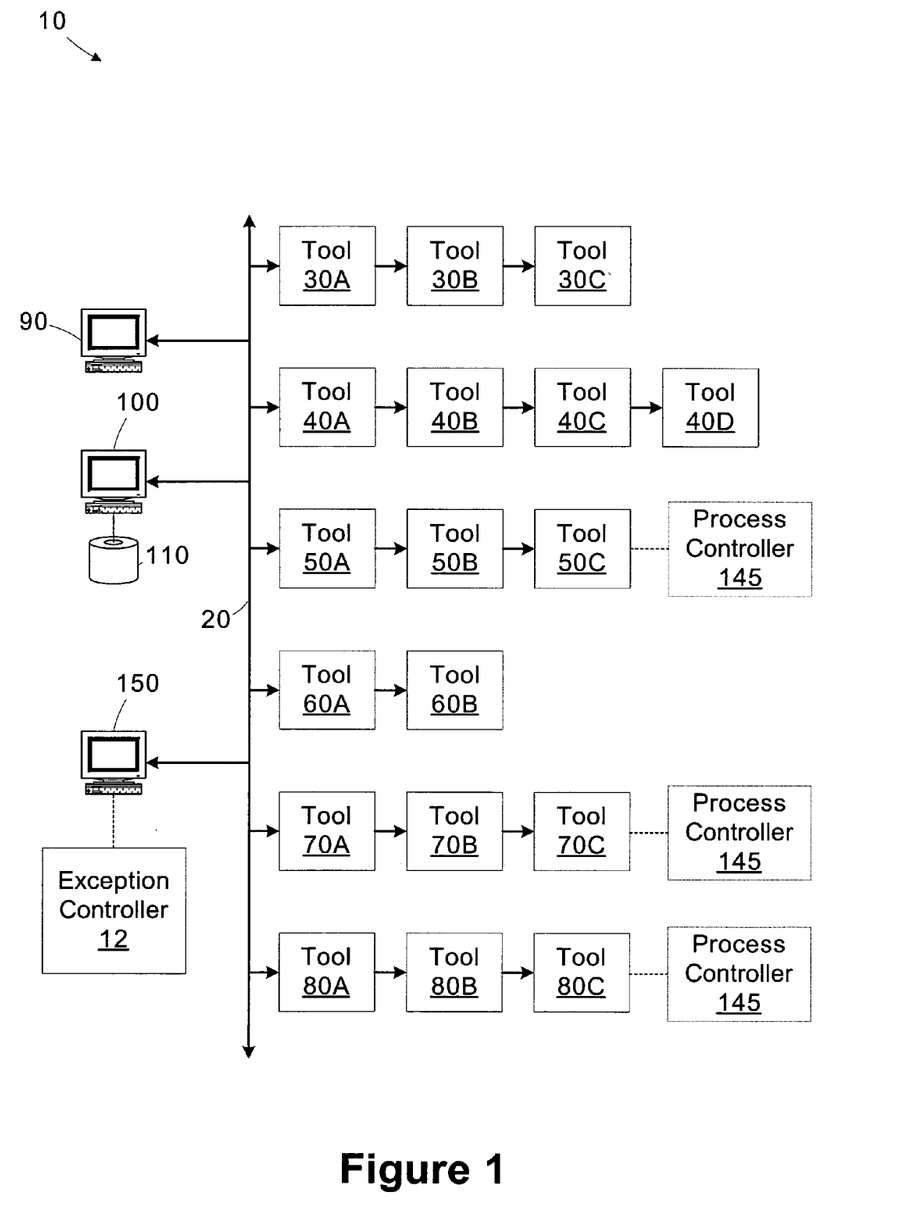
FIG. 1 is a simplified block diagram of a manufacturing system in accordance with one illustrative embodiment of the present invention.

Referring to FIG. 1, a simplified block diagram of an illustrative manufacturing system 10 is provided. In the illustrated embodiment, the manufacturing system 10 is adapted to fabricate semiconductor devices. Although the invention is described as it may be implemented in a semiconductor fabrication facility, the invention is not so limited and may be applied to other manufacturing environments. The techniques described herein may be applied to a variety of workpieces or manufactured items, including, but not limited to, microprocessors, memory devices, digital signal processors, application specific integrated circuits (ASICs), or other devices. The techniques may also be applied to workpieces or manufactured items other than semiconductor devices.

A network 20 interconnects various components of the manufacturing system 10, allowing them to exchange information. The illustrative manufacturing system 10 includes a plurality of tools 30–80. Each of the tools 30–80 may be coupled to a computer (not shown) for interfacing with the network 20. The tools 30–80 are grouped into sets of like tools, as denoted by lettered suffixes. For example, the set of tools 30A–30C represent tools of a certain type, such as a chemical mechanical planarization tool. A particular wafer or lot of wafers progresses through the tools 30–80 as it is being manufactured, with each tool 30–80 performing a specific function in the process flow. Exemplary processing tools for a semi-conductor device fabrication environment include metrology tools, photolithography steppers, etch tools, deposition tools, polishing tools, rapid thermal anneal tools, implantation tools, etc. The tools 30–80 are illustrated in a rank and file grouping for illustrative purposes only. In an actual implementation, the tools 30–80 may be arranged in any physical order or grouping. Additionally, the connections between the tools in a particular grouping are meant to represent connections to the network 20, rather than interconnections between the tools 30–80.

A manufacturing execution system (MES) server or controller 90 directs high level operation of the manufacturing system 10. The MES server 90 may monitor the status of the various entities in the manufacturing system 10 (i.e., lots, tools 30–80) and control the flow of articles of manufacture (e.g., lots of semiconductor wafers) through the process flow. A database server 100 is provided for storing data related to the status of the various entities and articles of manufacture in the process flow. The database server 100 may store information in one or more data stores 110. The data may include pre-process and post-process metrology data, tool states, lot priorities, operating recipes, etc. The controller 90 may also provide operating recipes to one or more of the tools depicted in FIG. 1. Of course, the controller 90 need not perform all of these functions. Moreover, the functions described for the controller 90 may be performed by one or more computers spread throughout the system 10.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

The manufacturing system 10 also includes an exception control (EC) unit 12 executing on an illustrative workstation 150. As described more fully below, the EC unit 12 may be employed in clearing various exception conditions that may exist within the manufacturing system 10. The EC unit 12 described herein may be used as described herein with respect to clearing exception conditions for any type of tool that is used to perform any type of operation. For example, the EC unit 12 may be used as described herein with any of a variety of different metrology tools and any of a variety of different process tools, e.g., etch tools, deposition tools, CMP tools, etc. Thus, the present invention should not be considered as limited in use to any particular type of tool unless such limitations are expressly set forth in the appended claims.

The EC unit 12 may communicate with the controller 90 and/or with one or more process controllers 145 associated with the individual tools 30–80 for purposes to be described later herein. The particular control models used by the process controllers 145 depend on the type of tool 30–80 being controlled. The control models may be developed empirically using commonly known linear or non-linear techniques. The control models may be relatively simple equation-based models (e.g., linear, exponential, weighted average, etc.) or a more complex model, such as a neural network model, principal component analysis (PCA) model, partial least squares projection to latent structures (PLS) model. The specific implementation of the control models may vary depending on the modeling techniques selected and the process being controlled. The selection and development of the particular control models would be within the ability of one of ordinary skill in the art, and accordingly, the control models are not described in greater detail herein for clarity and to avoid obscuring the instant invention.

An exemplary information exchange and process control framework suitable for use in the manufacturing system 10 is an Advanced Process Control (APC) framework, such as may be implemented using the Catalyst system formerly offered by KLA-Tencor, Inc. The Catalyst system uses Semiconductor Equipment and Materials International (SEMI) Computer Integrated Manufacturing (CIM) Framework compliant system technologies and is based the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI, which is headquartered in Mountain View, Calif.

The processing and data storage functions are distributed amongst the different computers or workstations in FIG. 1 to provide general independence and central information storage. Of course, different numbers of computers and different arrangements may be used without departing from the spirit and scope of the instant invention.

Figure 2:
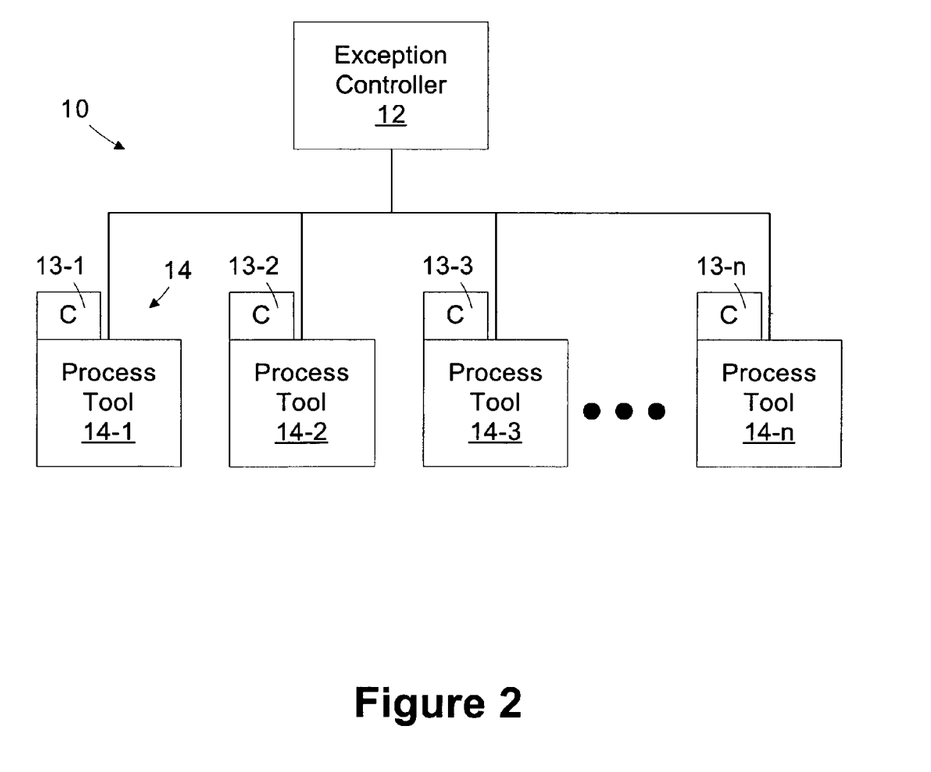
FIG. 2 is a simplified block diagram of a more detailed depiction of a fault detection system in accordance with one illustrative embodiment of the present invention.

FIG. 2 is a more specific, simplified block diagram of a manufacturing system 10 in accordance with one illustrative embodiment of the present invention. As shown therein, the EC unit 12 is operatively coupled to a plurality of tools 14. In the illustrative embodiment, four such illustrative tools, 14-1, 14-2, 14-3 and 14-n are schematically depicted. However, the present invention may be employed with any such number of tools. As stated previously, the tools 14 may be any of a variety of metrology tools or process tools. In some embodiments, each of the tools 14 further comprise a local controller 13.

As indicated previously, the tools 14 may be comprised of any of a variety of different types of tools useful in manufacturing a workpiece and/or performing metrology operations. In the context of a semiconductor manufacturing operation, the tools 14 may be process tools, such as a deposition tool, a thermal growth tool, an etching tool, a furnace, a rapid thermal anneal chamber, a photolithography tool, a chemical mechanical polishing tool, etc. In the illustrative example where the tools 14 are metrology tools, the tools 14 may be a metrology tool adapted to measure at least one of film thickness, film optical properties, surface profile, critical dimensions, etc. Thus, the present invention should not be considered as limited to any particular type of tool nor to the type of operation such tool performs.

The EC unit 12 may be employed in performing various actions to clear exception conditions. As indicated previously, an exception condition may be understood to be a condition that would interfere with normal manufacturing operations, e.g., the running of production wafers in a semiconductor manufacturing facility. That is, situations may arise where a workpiece, e.g., a lot of wafers, must be successfully processed prior to allowing other workpieces, e.g., lots of wafers, to be processed. In one sense, a specific workpiece may have an associated quantity of material, i.e., additional workpieces, that cannot be processed until the specific workpiece has been successfully processed. Successful processing of the specific workpiece to clear the exception condition may involve performing one or more metrology operations on the specific workpiece. In that case, the specific workpiece may be given a high priority for the needed metrology operation. In other cases, such a lot may be given a higher priority on other process operations leading up to the desired metrology operation. For example, if a new etching process is being implemented in an etch tool, the selected lot may be given a high priority at a subsequent photoresist strip operation (ashing) and at a subsequent chemical cleaning process, such that the selected lot may be subjected to the desired metrology operation as quickly as possible.

By way of example only, in the context of a semiconductor manufacturing facility, one such exception condition may be a new thread initialization type exception condition. Such a new thread exception condition may arise in the context of selecting a new group or combination of process tools to perform a plurality of process operations on a lot of wafers. For example, a photolithography tool, an etch tool, and a chemical cleaning tool may be an illustrative combination of tools. Since the selected combination of tools is new, there is little or no historical metrology data that can be evaluated to determine the past success of such a tool set combination. In that case, an initial lot may be processed through the selected tool set. Thereafter, an exception may be created such that no additional wafer lots are processed in the selected tool set until such time as metrology data for the initial lot has been acquired and analyzed.

Another example of an exception condition includes a so-called expired or old thread initialization. As one example, this situation may arise where a tool set combination is selected for processing wafers, but the selected tool set combination has not been used in a very long time. In this situation, there may be very little useful historical data regarding the performance of the selected tool set combination. In that case, as with the new thread initialization exception, additional lots of material may not be processed through the selected set of tools until such time as metrology data is acquired and analyzed for the initial lot.

Another example is a so-called jeopardy exception. This concept involves establishing a limit as to how many lots of wafers can be processed through a given set of tools or have a process operation performed thereon without having to wait for metrology feedback regarding one or more lots processed in the subject tool set. In some cases, a default value may be created for the jeopardy exception condition. That is, irrespective of any other considerations, a business rule may be established so that no more than a fixed number of workpieces, e.g., 10 lots of wafers, may be processed at a given operation without the acquisition and analysis of metrology data related to the specific process operation or tool.

In one illustrative embodiment of the present invention, the EC unit 12 may be employed to clear exception conditions based on, among other things, the quantity of material that cannot be cleared because of the exception, i.e., the amount of material being withheld from processing due to the exception condition. That is, prioritizing processing of each of a plurality of workpieces may be determined, at least in part, by the quantity of material that cannot be processed until each of the plurality of workpieces has been successfully processed. In another embodiment, the present invention may also assign a numeric weighting value to various classes of exceptions. In accordance with one specific embodiment, the priority of processing workpieces for purposes of clearing exception conditions may be determined in accordance with the following algorithm:

$$P_i = \sum_{j=1}^{N} \varpi_j Q_j \qquad \text{(Equation 1)}$$

where $P_i$ is the priority of lot "i," j represents a class of exception (e.g., initialization or jeopardy), $\varpi_j$ represents a numeric weighting given to a specific class of exception, and $Q_j$ represents the quantity of material that is held up or cannot be processed due to exception j. If a lot cannot be used to clear an exception condition, then the quantity $(Q_j)$ of material associated with that lot would be zero.

The numeric weighting value $(\varpi_j)$ associated with the various classes of exception conditions may also be included because the impact to manufacturing activities may be different for the various classes of exception conditions. The numeric value $(\varpi_j)$ may be an arbitrary value. For example, the need to clear a first type of exception, e.g., an initialization exception, may be higher than a second type of exception, e.g., a jeopardy exception, even if the amount of material that cannot be processed is the same for both the first and second types of conditions. In the context of producing a new product, a lot of wafers may be given a very high numeric weighting value so that the new product can be manufactured and sent to the ultimate customer for testing and approval. In such a case, the lot of wafers from which the new product will be manufactured may be given a higher priority relative to another exception condition that holds up production on a greater quantity of material, e.g., a greater number of lots.

Additionally, it should be noted that a single class of exception condition may correspond to several different automated process control algorithms. For example, if two conditions are operating in parallel in a lithography operation, e.g., overlay and exposure control, a single lot may clear an exception condition, e.g., an initialization condition, for both controllers. In that situation, the material that cannot be processed for both controllers should be included in the term $Q_j$. The above algorithm (Equation 1) applies a higher priority to lots that (1) could allow more work-in-progress (WIP) to be processed and (2) could clear multiple exception conditions.

In an alternative embodiment, priority for various lots may take into consideration the fraction or percentage of material that cannot be processed due to the exception class instead of the quantity of material that cannot be processed due to the exception class. For example, priority to clearing exception conditions in accordance with the following algorithm:

$$P_i = \sum_{j=1}^{N} \varpi_j F_j \quad \text{(Equation 2)}$$

where everything is defined as previously and $F_j$ is the fraction of available material that cannot be processed due to exception class j.

This alternative algorithm may be useful in situations where two exception conditions are occurring that affect two different work-in-progress (WIP) queues. For example, a first WIP queue may have a small number of lots (e.g., 5) in the queue and a low number of lots (e.g., 3) affected by an exception condition. However, the lots in the first WIP queue that cannot be processed due to the exception condition represent a very high percentage of the overall first WIP queue (e.g., 3/5 or 60%). In contrast, a second WIP queue may have a large number of lots (e.g., 20) in the queue and a relatively large number of lots (e.g., 10) that cannot be processed due to the exception condition. However, the percentage of lots in the second WIP queue affected by the exception condition may be smaller (e.g., 10/20 or 50%) than the percentage of lots impacted in the first WIP queue (e.g., 60%). In one illustrative example, it may be preferable to prioritize the lots affecting the smaller overall queue, e.g., the first WIP queue, in order to keep material flowing through the smaller WIP queue. In both versions of the algorithms, lots with higher priority values are given higher priorities in the dispatching queues.

Figure 3:
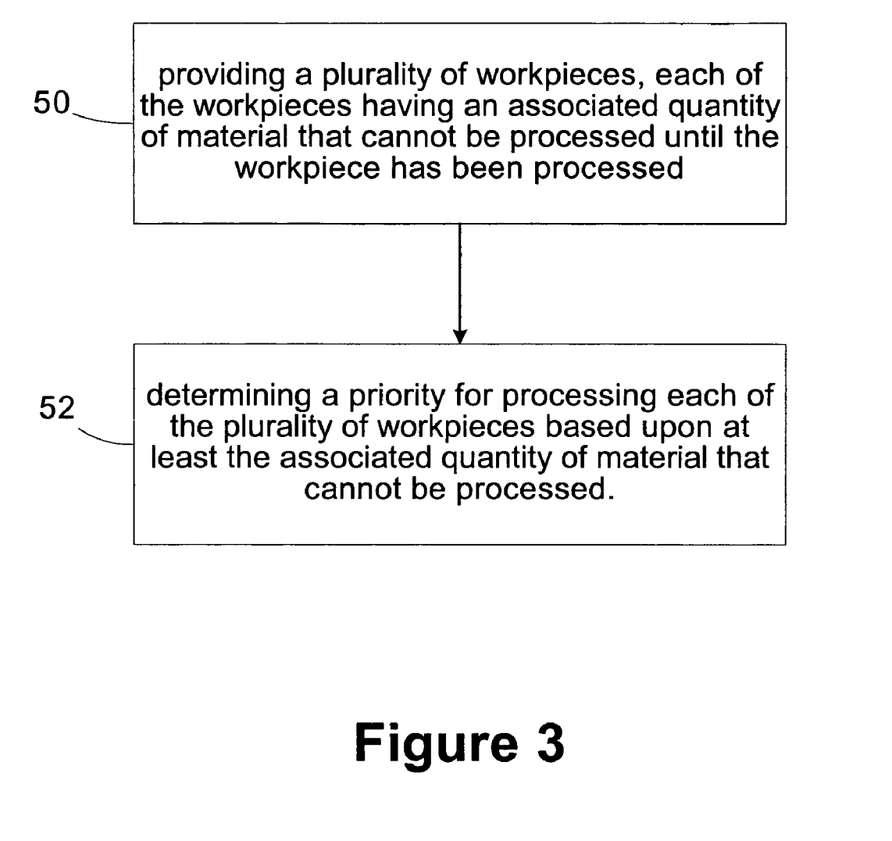
FIG. 3 is a simplified flow diagram of a method in accordance with one illustrative embodiment of the present invention.

The present invention is generally directed to various methods and systems for prioritizing material to clear exception conditions. The present invention may be employed with any type of tool, e.g., process tools, metrology tools, etc. One illustrative method is depicted in flowchart form in FIG. 3. As shown therein, in one illustrative embodiment, the method comprises providing a plurality of workpieces, each of the workpieces having an associated quantity of material that cannot be processed until the workpiece has been processed, as indicated in block 50, and determining a priority for processing each of the plurality of workpieces based upon at least the associated quantity of material that cannot be processed, as set forth in block 52. In further embodiments, the method comprises processing the plurality of workpieces in accordance with the determined priority. In still further embodiments, the method comprises processing additional workpieces. The workpieces may be any type of workpiece, e.g., individual wafers or lots of wafers, etc.

In another illustrative embodiment, the method comprises providing a plurality of workpieces, for each of the workpieces, identifying a quantity of material that cannot be processed until the workpiece has been subjected to at least one metrology operation, and determining a priority for processing each of the plurality of workpieces based upon at least the quantity of material that cannot be processed.

In yet another illustrative embodiment, the method comprises providing a plurality of wafer lots, for each of the wafer lots, identifying a quantity of material that cannot be processed until the wafer lot has been subjected to at least one metrology operation, and determining a priority for processing each of the plurality of wafer lots based upon the identified quantity of material that cannot be processed. In further embodiments, the method comprises performing the metrology operation on the subject lot, and, thereafter, processing additional wafer lots. In yet further embodiments, the priority for processing the workpieces or lots may be determined by assigning the highest processing priority to the workpieces or lots with the higher relative quantity of material that cannot be processed.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
   providing a plurality of workpieces, each of said workpieces having an associated quantity of material that cannot be processed until said workpiece has been processed; and
   determining a priority for processing each of said plurality of workpieces based upon at least said associated quantity of material that cannot be processed.

2. The method of claim 1, wherein said step of determining a priority for processing each of said plurality of workpieces comprises assigning higher processing priority to workpieces based upon said quantity of material that cannot be processed.

3. The method of claim 1, wherein said step of determining a priority for processing each of said plurality of workpieces comprises assigning a higher processing priority to one of said plurality of workpieces having associated therewith a larger quantity of material that cannot be processed as compared to at least one other of said plurality of workpieces.

4. The method of claim 1, further comprising assigning an arbitrary numeric value to each of said plurality of workpieces and wherein said step of determining said priority for processing comprises determining said priority for processing each of said plurality of workpieces based upon both said quantity of material that cannot be processed and said numeric value associated with said workpieces.

5. The method of claim 1, wherein each of said workpieces is a lot of wafers.

6. The method of claim 1, further comprising processing said plurality of workpieces in accordance with said determined priority.

7. The method of claim 6, wherein said step of determining a priority for processing each of said plurality of workpieces comprises determining a priority for performing at least one metrology operation on each of said plurality of workpieces.

8. The method of claim 6, further comprising processing additional workpieces.

9. The method of claim 1, wherein each of said plurality of workpieces constitutes an exception condition.

10. The method of claim 9 wherein said exception condition comprises at least one of an initialization condition and a jeopardy condition.

11. The method of claim 9 further comprising determining a priority for processing each of said plurality of workpieces based upon a class of said exception condition.

12. A method, comprising:
  providing a plurality of workpieces; for each of said workpieces, identifying a quantity of material that cannot be processed until said workpiece has been subjected to at least one metrology operation; and
  determining a priority for processing each of said plurality of workpieces based upon at least said quantity of material that cannot be processed.

13. The method of claim 12, wherein said step of determining a priority for processing each of said plurality of workpieces comprises assigning higher processing priority to workpieces based upon said quantity of material that cannot be processed.

14. The method of claim 12, wherein said step of determining a priority for processing each of said plurality of workpieces comprises assigning a higher processing priority to one of said plurality of workpieces having associated therewith a larger quantity of material that cannot be processed as compared to at least one other of said plurality of workpieces.

15. The method of claim 12, further comprising assigning an arbitrary numeric value to each of said plurality of workpieces and wherein said step of determining said priority for processing comprises determining said priority for processing each of said plurality of workpieces based upon both said quantity of material that cannot be processed and said numeric value associated with said workpieces.

16. The method of claim 12, wherein each of said workpieces is a lot of wafers.

17. The method of claim 12, further comprising processing said plurality of workpieces in accordance with said determined priority.

18. The method of claim 17, further comprising processing additional workpieces.

19. The method of claim 12, wherein each of said plurality of workpieces constitutes an exception condition.

20. The method of claim 19, wherein said exception condition comprises at least one of an initialization condition and a jeopardy condition.

21. The method of claim 19, further comprising determining a priority for processing each of said plurality of workpieces based upon a class of said exception condition.

22. A method, comprising:
  providing a plurality of wafer lots;
  for each of said wafer lots, identifying a quantity of material that cannot be processed until said wafer lot has been subjected to at least one metrology operation; and
  determining a priority for processing each of said plurality of wafer lots based upon said identified quantity of material that cannot be processed.

23. The method of claim 22, wherein said step of determining a priority for processing each of said plurality of wafer lots comprises assigning higher processing priority to wafer lots based upon said quantity of material that cannot be processed.

24. The method of claim 22, wherein said step of determining a priority for processing each of said plurality of wafer lots comprises assigning a higher processing priority to one of said plurality of wafer lots having associated therewith a larger quantity of material that cannot be processed as compared to at least one other of said plurality of wafer lots.

25. The method of claim 22, further comprising assigning an arbitrary numeric value to each of said plurality of wafer lots and wherein said step of determining said priority for processing comprises determining said priority for processing each of said plurality of wafer lots based upon both said quantity of material that cannot be processed and said numeric value associated with said wafer lots.

26. The method of claim 22, further comprising processing said plurality of wafer lots in accordance with said determined priority.

27. The method of claim 26, further comprising processing additional wafer lots.

28. The method of claim 22, wherein each of said plurality of wafer lots constitutes an exception condition.

29. The method of claim 28, wherein said exception condition comprises at least one of an initialization condition and a jeopardy condition.

30. The method of claim 28, further comprising determining a priority for processing each of said plurality of wafer lots based upon a class of said exception condition.

* * * * *